(12) United States Patent
Uppal et al.

(10) Patent No.: US 10,089,014 B2
(45) Date of Patent: Oct. 2, 2018

(54) MEMORY-SAMPLING BASED MIGRATING PAGE CACHE

(71) Applicant: Advanced Micro Devices, Inc., Sunnyvale, CA (US)

(72) Inventors: Ahsen Jamshed Uppal, Silver Spring, MD (US); Mitesh R. Meswani, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 14 days.

(21) Appl. No.: 15/273,325

(22) Filed: Sep. 22, 2016

(65) Prior Publication Data

US 2018/0081541 A1     Mar. 22, 2018

(51) Int. Cl.
*G06F 12/08* (2016.01)
*G06F 3/06* (2006.01)

(52) U.S. Cl.
CPC ............ *G06F 3/061* (2013.01); *G06F 3/0647* (2013.01); *G06F 3/0653* (2013.01); *G06F 3/0683* (2013.01); *G06F 12/08* (2013.01); *G06F 2212/1016* (2013.01)

(58) Field of Classification Search
CPC ...................................................... G06F 12/08
USPC .......................................................... 711/117
See application file for complete search history.

(56) References Cited

U.S. PATENT DOCUMENTS 7,669,011 B2    2/2010  Conway
8,499,066 B1*   7/2013  Zhang .................. H04L 47/823
                                                    709/200
2013/0036266 A1*  2/2013  Naganuma ............. G06F 3/061
                                                    711/114
2014/0365738 A1* 12/2014  Hod .................... G06F 12/0284
                                                    711/160
2015/0088805 A1*  3/2015  Kakarla ............ G06F 17/30306
                                                    707/600
2016/0378655 A1  12/2016  Blagodurov et al.
(Continued)

OTHER PUBLICATIONS

Farmahini-Farahani et al., U.S. Appl. No. 15/264,400, entitled "Dynamic Adaptation of Memory Page Management Policy", filed Sep. 13, 2016, 47 pages.

(Continued)

*Primary Examiner* — Gautam Sain
(74) *Attorney, Agent, or Firm* — Meyertons Hood Kivlin Kowert and Goetzel PC; Rory D. Rankin (57) ABSTRACT

Systems, apparatuses, and methods for implementing a memory sampling based migrating page cache are disclosed. In one embodiment, a system includes one or more processors and a multi-level memory hierarchy. The system is configured to record metadata associated with a portion of memory access instructions executed by one or more processors in one or more sampling intervals. The system generates predictions on which memory pages will be accessed in a subsequent sampling interval based on the recorded metadata. The system migrates one or more memory pages to a first memory level from a second memory level responsive to predicting that the one or more memory pages will be accessed in the subsequent sampling interval. The system also adjusts a duration of the sampling interval based on the number of memory accesses or a number of page faults per interval.

14 Claims, 7 Drawing Sheets

(56) References Cited

U.S. PATENT DOCUMENTS

2017/0262216 A1* 9/2017 Polkovnikov ......... G06F 3/0647

OTHER PUBLICATIONS

Piga et al., U.S. Appl. No. 15/269,289, entitled "Page Migration Acceleration Using a Two-Level Bloom Filter on High Bandwidth Memory Systems", filed Sep. 19, 2016, 30 pages.

* cited by examiner

FIG. 7 ately optimization points. In some systems, high-bandwidth stacked memories are integrated with a system on chip (SoC), with the SoC also connected to traditional off-package memory. For example, consider a

MEMORY-SAMPLING BASED MIGRATING PAGE CACHE

BACKGROUND

Description of the Related Art

To meet memory bandwidth, latency and capacity demands, computing systems are likely to contain multiple levels of memory. The different memory levels may be composed of different technologies giving different performance, cost, and resiliency optimization points. In some systems, high-bandwidth stacked memories are integrated with a system on chip (SoC), with the SoC also connected to traditional off-package memory. For example, consider a two-level memory system with a first level of die-stacked dynamic random-access memory (DRAM) and a second level of off-chip DRAM. In this example, latency is lower and bandwidth is higher to the first level of DRAM while the second level of DRAM provides greater capacity. This trend of multiple memory levels will likely continue in future computing systems. In general, a system can have more than two levels, including one or more non-volatile random-access memory (NVRAM) levels. Determining how to allocate memory pages to the different memory levels can be challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a memory sampling based migrating page cache are disclosed. In one embodiment, a system includes one or more processors and a multi-level memory hierarchy. The system is configured to record metadata associated with a portion of memory access instructions executed by one or more processors in one or more sampling intervals. The system generates predictions on which memory pages will be accessed in a subsequent sampling interval based on the recorded metadata, wherein the second interval is subsequent to the first interval. The system migrates one or more memory pages to a first memory level from a second memory level responsive to predicting that the one or more memory pages will be accessed in the subsequent sampling interval. The system can also optionally adjust a duration of the sampling interval based on the number of memory accesses or a number of page faults per interval. In some embodiments, the system can utilize static object placement to pin certain pages to the first memory level.

Figure 1:
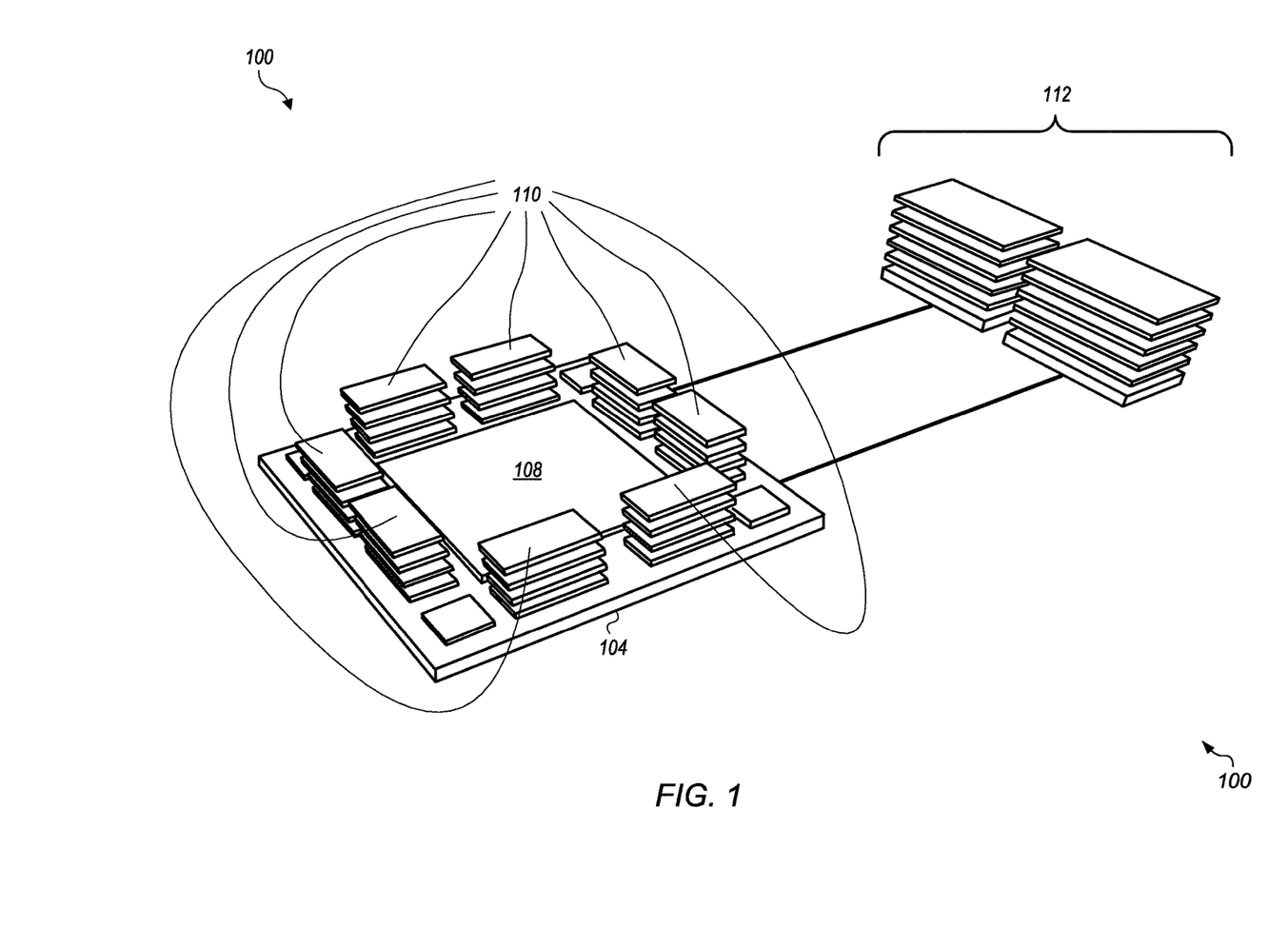
FIG. 1 is a block diagram of one embodiment of a computing system.

Referring now to FIG. 1, a block diagram of one embodiment of a computing system 100 is shown. In one embodiment, computer system 100 includes an accelerated processing unit (APU) 108 and a first level of memory 110 on a substrate 104 and a second level of memory 112 coupled to substrate 104. APU 108 is representative of any number and type of processing units (e.g., CPU, GPU) which may be combined together. Computer system 100 is a two level memory (TLM) system as shown in FIG. 1. In other embodiments, system 100 can include other numbers of memory levels.

In one embodiment, first level of memory 110 is implemented as die-stacked dynamic random-access memory (DRAM). It is noted that first level of memory 110 can also be referred to as a page cache. In some cases, the capacity of the die-stacked DRAM of first level of memory 110 can be limited by heat and cost. Additionally, in one embodiment, second level of memory 112 is implemented using DRAM, and second level of memory 112 is slower and larger than first level of memory 110. In another embodiment, system 100 can include a NVRAM memory module as a third memory level. It is noted that in other embodiments, system 100 can include a multi-level memory hierarchy including all possible combinations of memory capacity ratios amongst the different levels, memory technology used at each level, and the number of levels of memory hierarchy. While a two-level memory (TLM) is used in many instances within this disclosure for explanation purposes, it should be understood that the methods and mechanisms described herein can be used with three-level memory hierarchies, four-level memory hierarchies, and so on.

In one embodiment, the stacked DRAM of first level of memory 110 provides lower latency and/or higher bandwidth for memory accesses while the off-package second level of memory 112 has larger capacity. In this embodiment, first level of memory 110 and second level of memory 112 represent a non-uniform memory access (NUMA) hierarchy. In one embodiment, first level of memory 110 can act as a page cache while the second level of memory 112 acts as a backing store. In one embodiment, system 100 maps both first level of memory 110 and second level of memory 112 to the same physical address space. In other words, first level of memory 110 and second level of memory 112 can together implement main memory by each implementing a respective subset of the main memory physical address space. The term "system memory" or "main system memory" is used herein to refer to one or more physical memory components of a given type, which are used to implement all or part of a system's main memory address space. The term system memory is therefore distinguished from "cache memory", which does not implement the main memory address space, but rather stores local copies of data stored in a system memory.

In one embodiment, APU 108 includes one or more central processing units (CPUs). APU 108 can also include one or more graphics processing units (GPUs). In one embodiment, the CPU(s) and/or GPU(s) of APU 108 can include logic that allows executing operations to be randomly tagged as they traverse through the processing pipeline. When these tagged instructions retire, additional metadata associated with each sampled operations can be recorded. For example, a CPU of APU 108 can collect event data as a tagged instruction executes and interrupts the CPU when the tagged instruction retires. In some embodiments, the sampling of instructions can be performed without interrupting the CPU. During the processing for this interrupt, the metadata associated with the instruction can be saved and processed. For memory operations, this metadata can include a timestamp, instruction address, data virtual address, data physical address, load or store status, cache miss statistics, as well as additional information. Such memory instruction sampling can be achieved with low run-time overhead.

The processors of APU 108 are configured to execute the main control software of system 100, such as an operating system. Generally, software executed by the processors of APU 108 during use can control the other components of system 100 to realize the desired functionality of system 100. The processors of APU 108 can also execute other software, such as application programs. The application programs can provide user functionality, and can rely on the operating system for lower level device control. In one embodiment, the operating system of APU 108 can manage first level of memory 110 and second level of memory 112 as a unified physical address space.

In one embodiment, a monitor in the system software (e.g., operating system, device drivers, middleware) is implemented to record and process memory sample data across system 100 and collect page access frequencies for virtual address and/or physical address pages. In one embodiment, predictive migration can use other history data to infer which pages will be accessed soon. In another embodiment, the monitor periodically ranks pages based on recent access frequency and remaps any frequently accessed pages currently mapped to second memory level 112 to first memory level 110. In one embodiment, at the end of each sampling interval, the top-N most frequently accessed pages will be placed into first memory level 110, with the value of N varying from embodiment to embodiment. In one embodiment, the value of N can correspond to the capacity of first memory level 110. By performing counting and migration, the monitor can decay access counts from the previous time interval, thus time averaging page access frequencies. In one embodiment, the term "decay" is defined as clearing accessing counts. In other embodiments, the term "decay" is defined as reducing the access counts by applying a weighting factor to the access counts, with the weighting factor reduced over time. As used herein, a "sampling interval" is defined as a period of time in which metadata associated with instructions being executed is collected. A "non-sampling interval" is defined as a period of time when the monitor is not collecting metadata.

An advantage of the approaches described herein is the low overhead in gathering access statistics. In one embodiment, the sampling rate can be tuned to minimize the overhead versus placement accuracy. Another advantage of the approaches is that they do not require user intervention and the operating system has the potential to use global memory access information to make decisions. In one embodiment, the operating system can select sampling interval durations based on a fixed time schedule. In another embodiment, the operating system can select a sampling interval duration based on the number of page faults and/or memory accesses.

Figure 2:
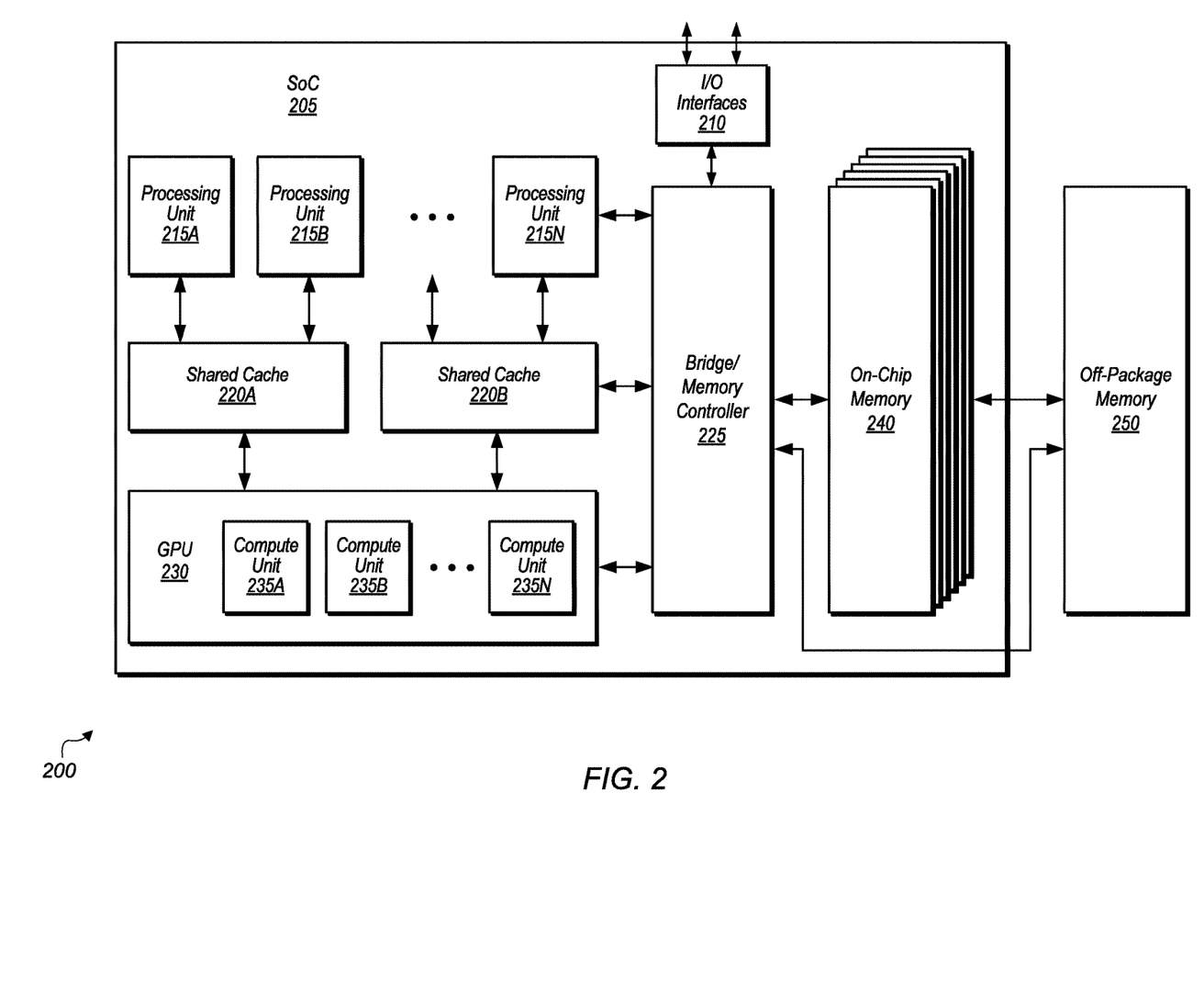
FIG. 2 is a block diagram of another embodiment of a computing system.

Turning now to FIG. 2, a block diagram of one embodiment of a computing system 200 is shown. In one embodiment, computing system 200 includes system on chip (SoC) 205 coupled to off-package memory 250. SoC 205 can also be referred to as an integrated circuit (IC). In one embodiment, SoC 205 includes processing units 215A-N, input/output (I/O) interfaces 210, shared caches 220A-B, bridge/memory controller 225, graphics processing unit (GPU) 230, and on-chip memory 240 which can be a stacked DRAM. In one embodiment, on-chip memory 240 corresponds to first level of memory 110 (of FIG. 1) and off-package memory 250 corresponds to second level of memory 112. SoC 205 can also include other components not shown in FIG. 2 to avoid obscuring the figure.

Processing units 215A-N are representative of any number and type of processing units. In one embodiment, processing units 215A-N are CPU cores. Processing units 215A-N are coupled to shared caches 220A-B and bridge/memory controller 225. GPU 230 includes compute units 235A-N which are representative of any number and type of compute units. GPU 230 is coupled to shared caches 220A-B and bridge/memory controller 225. I/O interfaces 210 are also coupled to bridge/memory controller 225. I/O interfaces 210 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 210. Such peripheral devices include (but are not limited to) displays, keyboards, mice, printers, scanners, joysticks or other types of game controllers, media recording devices, external storage devices, network interface cards, and so forth.

Processing units 215A-N and GPU 230 are configured to execute instructions of a particular instruction set architecture (ISA), which can include operating system instructions and user application instructions. These instructions include memory access instructions which can be translated and/or decoded into memory access requests or memory access operations targeting memories 240 and 250. In one embodiment, memory 240 and memory 250 can share the same virtual address space. Processing units 215A-N and compute units 235A-N of GPU 230 can include a memory management unit, translation lookaside buffer (TLB), and/or other logic for performing virtual-to-physical address translations for memory access requests. From processing units 215A-N and compute units 235A-N, if the targeted data is not in a local cache or shared caches 220A-B, memory access requests traverse through bridge/memory controller 225 and then the requests are conveyed from bridge/memory controller 225 to memory 240 or memory 250. In another embodiment, bridge/memory controller 225 can be split up into separate bridge and memory controller units.

In some embodiments, memory 250 includes a plurality of memory modules. Each of the memory modules can include one or more memory devices mounted thereon. In some embodiments, memory 250 includes one or more memory devices mounted on a motherboard or other carrier upon which SoC 205 is also mounted. In one embodiment, memory 250 is used to implement a random access memory (RAM) for use with SoC 205 during operation. The RAM implemented can be static RAM (SRAM) or dynamic RAM (DRAM). The type of DRAM that is used to implement memory 250 includes (but is not limited to) double data rate (DDR) DRAM, DDR2 DRAM, DDR3 DRAM, and so forth. In other embodiments, memory 250 can be implemented using other memory technologies, such as phase-change memory (PCM), non-volatile random-access memory (NVRAM), or other types of memory.

Although not explicitly shown in FIG. 2, SoC 205 can also include one or more cache memories that are internal to the processing units 215A-N and compute units 235A-N. In some embodiments, SoC 205 includes shared caches 220A-B that are utilized by processing units 215A-N and compute units 235A-N. In one embodiment, caches 220A-B are part of a cache subsystem including a cache controller. Additionally, computing system 200 can also include one or more persistent storage devices (e.g., optical storage, magnetic storage, hard drive, tape drive, solid state memory) which may persistently store data.

In various embodiments, computing system 200 can be a computer, laptop, mobile device, server, web server, cloud computing server, storage system, or any of various other types of computing systems or devices. It is noted that the number of components of computing system 200 and/or SoC 205 can vary from embodiment to embodiment. There can be more or fewer of each component/subcomponent than the number shown in FIG. 2. It is also noted that computing system 200 and/or SoC 205 can include other components not shown in FIG. 2. Additionally, in other embodiments, computing system 200 and SoC 205 can be structured in other ways than shown in FIG. 2.

Figure 3:
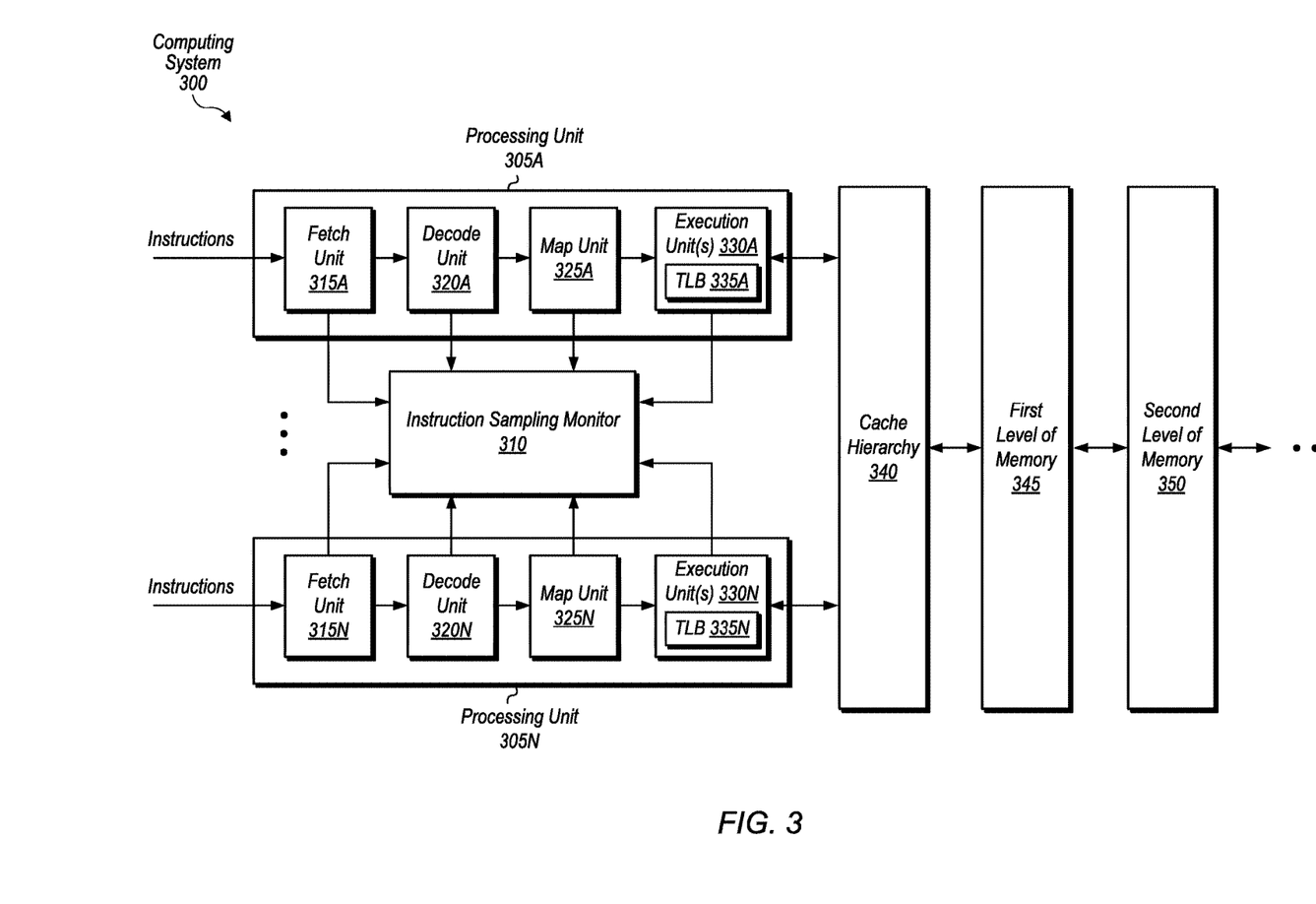
FIG. 3 is a block diagram of another embodiment of a computing system.

Referring now to FIG. 3, a block diagram of another embodiment of a computing system 300 is shown. Computing system 300 includes processing units 305A-N, instruction sampling monitor 310, cache hierarchy 340, first level of memory 345, and second level of memory 350. In other embodiments, computing system can have more than two levels of memory. Processing units 305A-N are representative of any number and type of processing units (e.g., CPU core, GPU compute unit, FPGA, ASIC) which can be included within computing system 300. Cache hierarchy 340 includes any number of cache levels, which can vary from embodiment to embodiment. It is noted that one or more caches of cache hierarchy 340 can be included within the processing pipelines of processing units 305A-N. For example, fetch units 315A-N can include an instruction cache and one or more of execution unit(s) 330A-N can include a data cache.

Instructions are fetched by fetch units 315A-N and then decoded into operations (or ops) by decode units 320A-N. Map units 325A-N perform register renaming and assign registers to source and destination registers in the operations. Execution units 330A-N are configured to execute the operations provided by previous pipeline stages. Execution units 330A-N can also include translation lookaside buffers (TLBs) 335A-N, respectively, to store a subset of virtual address to physical address mappings to keep track of where virtual pages are located in the physical address space of memories 345 and 350. In other embodiments, processing units 305A-N can also include additional logic (e.g., register file, instruction cache, reorder buffer) and/or be organized differently than what is shown in FIG. 3.

Instruction sampling monitor 310 is configured to record and process memory access instruction sample data from throughout system 300. Instruction sampling monitor 310 can be implemented using any combination of hardware and/or software. In one embodiment, instruction sampling monitor 310 is part of the operating system or system software and can execute on one or more of processing units 305A-N to implement the techniques described herein. In another embodiment, instruction sampling monitor 310 is a hardware component or other logical unit within system 300. In a further embodiment, instruction sampling monitor 310 is a combination of system software and hardware logic for implementing the techniques described herein.

In one embodiment, instruction sampling monitor 310 periodically selects instructions to be tagged and monitored. In one embodiment, instruction sampling monitor 310 only tags and monitors memory access instructions. During each pipeline stage, information about selected instructions can be conveyed from the pipeline stage to instruction sampling monitor 310. For example, the information which is sampled and conveyed to instruction sampling monitor 310 can include at least a timestamp, instruction address, data virtual address, data physical address, load or store status, cache miss statistics, and/or other information. Instruction sampling monitor 310 can utilize this information to determine how to map memory pages to the different levels of the memory hierarchy. As used herein, the term "page" is defined as a fixed-length contiguous block of virtual memory. A "page" is also defined as the smallest unit of data utilized for memory management by system 300. The size of a page can vary from embodiment to embodiment.

In one embodiment, instruction sampling monitor 310 is configured to record and process memory sample data across the system and collect page access frequencies for all virtual address pages. Periodically, monitor 310 ranks pages based on their recent access frequency and remaps any highly ranked pages currently mapped to second level of memory 350 to first level of memory 345. At the end of each sampling interval, the top N most frequently accessed pages can be placed into first level of memory 345. In one embodiment, the value of N is dictated by the size of the fast memory 345. By performing counting and migration, the monitor 310 can decay or clear access counts from the previous time interval, thus time-averaging page access frequencies. In one embodiment, the sampling rate can be tuned to minimize the overhead versus the placement accuracy.

In another embodiment, monitor 310 can rapidly respond to memory accesses to pages, and monitor 310 can rapidly migrate pages into first level of memory 345 when pages are first detected as accessed. Periodically, monitor 310 can inspect recently-accessed pages and any pages recently touched which are currently mapped to second level of memory 350 can be migrated to first level of memory 345. If the number of recently-accessed pages exceeds the capacity of first level of memory 345, then the recently-accessed pages can be secondarily ranked by recency or access frequency.

In a further embodiment, monitor 310 processes the instruction sample data to detect memory access patterns. Monitor 310 can utilize the detected access patterns to make predictions as to which pages are likely to be accessed in the next sampling interval. The predictions can be history-based, use heuristics, or a combination of history-based and heuristics. Then, the pages predicted to be accessed in the next interval that are currently in second level of memory 350 can be migrated from second level of memory 350 to first level of memory 345. Monitor 310 can also decay previous predictions over multiple sampling intervals, effectively using the previous predictions as inputs for determining subsequent predictions.

In one embodiment, the OS can select sampling interval durations based on a fixed time schedule. In another embodiment, the OS can select sampling interval durations based on the total number of memory accesses and/or page faults. In one embodiment, the term "page fault" is defined as an event when an instruction targets a memory page that is mapped into the virtual address space but the memory page is not loaded in main memory. Main memory refers to the combination of first level of memory 345 and second level of memory 350. In other embodiments, other events can be monitored, such as the number of occurrences of an instruction targeting a memory page that is not stored in first level of memory 345 but rather is stored in second level of memory 345. The OS can select sampling intervals based on these other events, the total number of memory accesses, page faults, or any combination of these metrics.

It is noted that computing system 300 represents one possible implementation of a computing system configured to perform the methods and mechanisms described herein. In other embodiments, computing system 300 can be organized in different manners and/or include other components.

Figure 4:
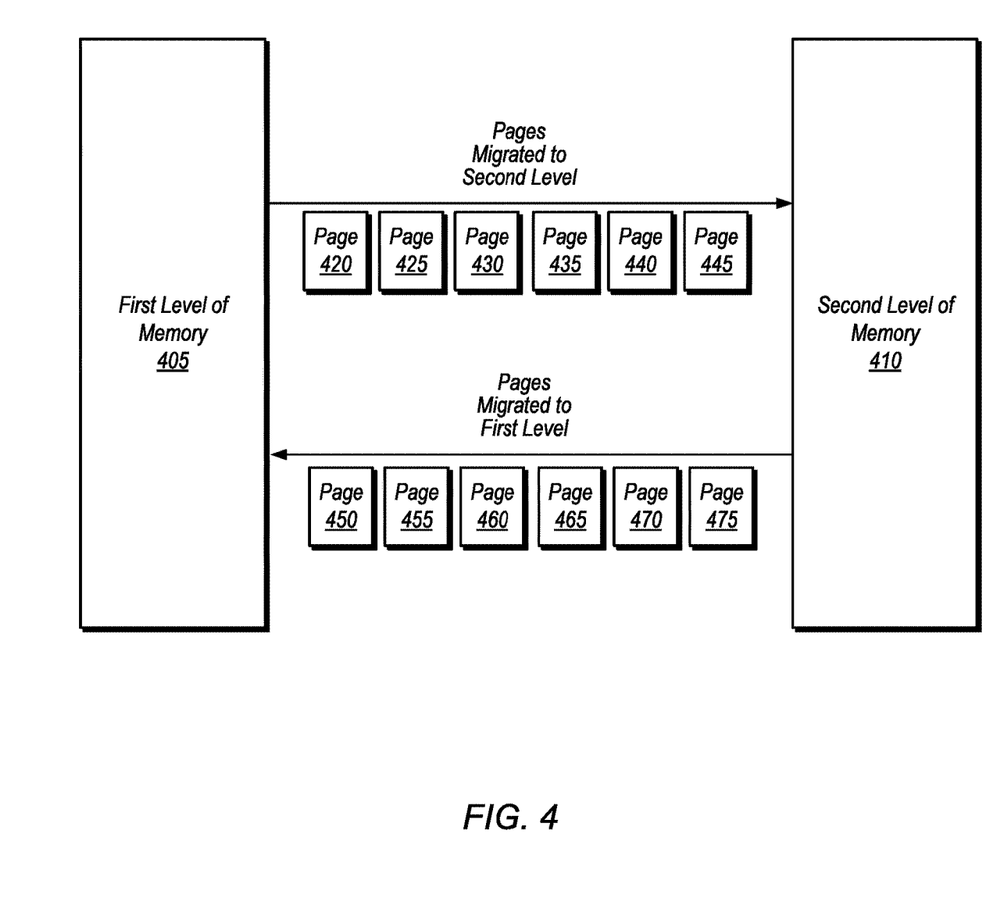
FIG. 4 is a block diagram of one embodiment of a two-level memory hierarchy.

Turning now to FIG. 4, a block diagram of one embodiment of a two-level memory hierarchy is shown. In one embodiment, first level of memory 405 and second level of memory 410 are included within a computing system with one or more processing units. The computing system can also include a monitor (e.g., monitor 310 of FIG. 3) for examining metadata associated with executing memory access instructions. At the conclusion of each sampling interval, the monitor can migrate memory pages between first level of memory 405 and second level of memory 410 based on the memory access instructions which were examined during the sampling interval. It should be understood that the terms "memory page" and "page" are intended to represent any size of memory region. If the monitor determines that one or more memory pages are currently stored in second level of memory 410 but these one or more memory pages are likely to be accessed by the one or more processing units in the next sampling interval, then the monitor can migrate these one or more memory pages from second level of memory 410 to first level of memory 405.

As shown in FIG. 4, pages 450, 455, 460, 465, 470, and 475 are migrated from second level of memory 410 to first level of memory 405. To make room for these migrated pages, pages 420, 425, 430, 435, 440, and 445 are migrated from first level of memory 405 to second level of memory 410. It is noted that depending on the decisions made by the monitor, more or less than six memory pages can be migrated between levels at the end of a given sampling interval. In one embodiment, once these memory pages are selected for migration, they are migrated by the operating system through the mechanism of system calls that change a page's physical location without changing the virtual address of the page. Examples of such system calls for a non-uniform memory access (NUMA) system include numa_move_pages and numa_migrate_pages. In other embodiments, other software and/or hardware mechanisms for migrating pages can be utilized.

Figure 5:
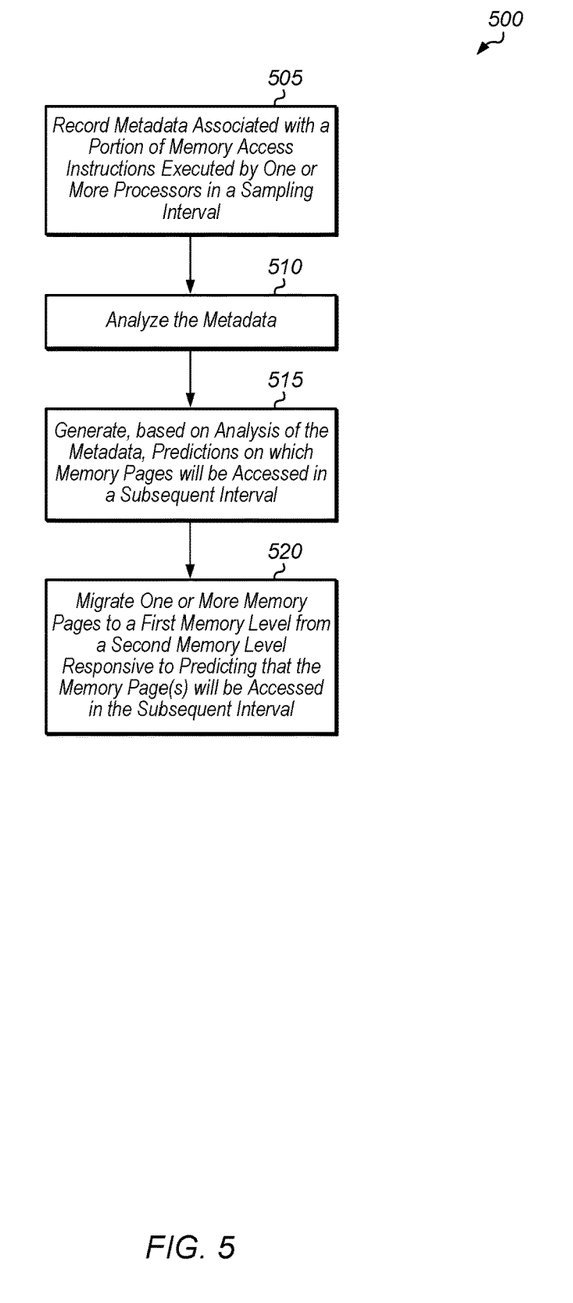
FIG. 5 is a generalized flow diagram illustrating one embodiment of a method for migrating memory pages between levels of memory.
Figure 6:
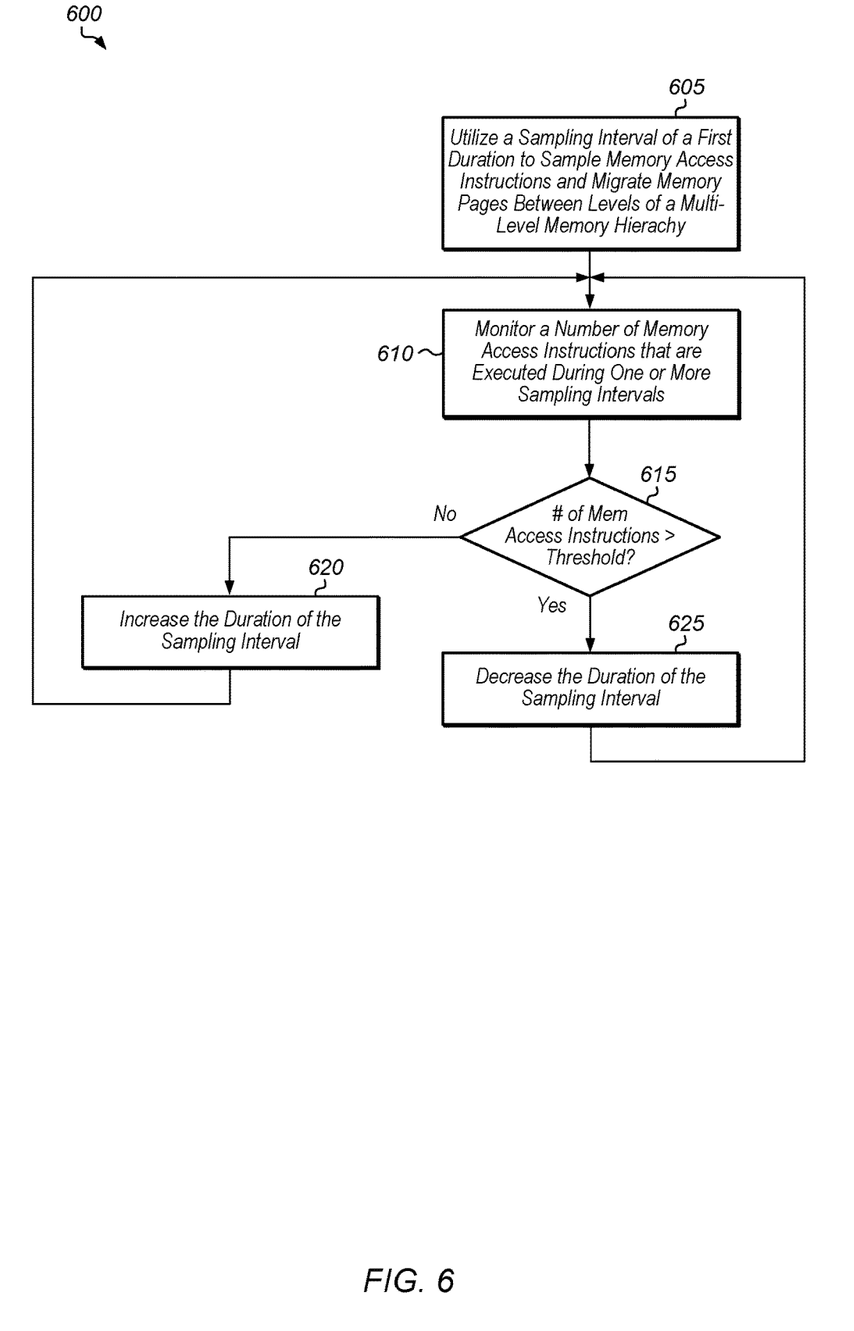
FIG. 6 is a generalized flow diagram illustrating one embodiment of a method for adjusting the duration of a sampling interval.
Figure 7:
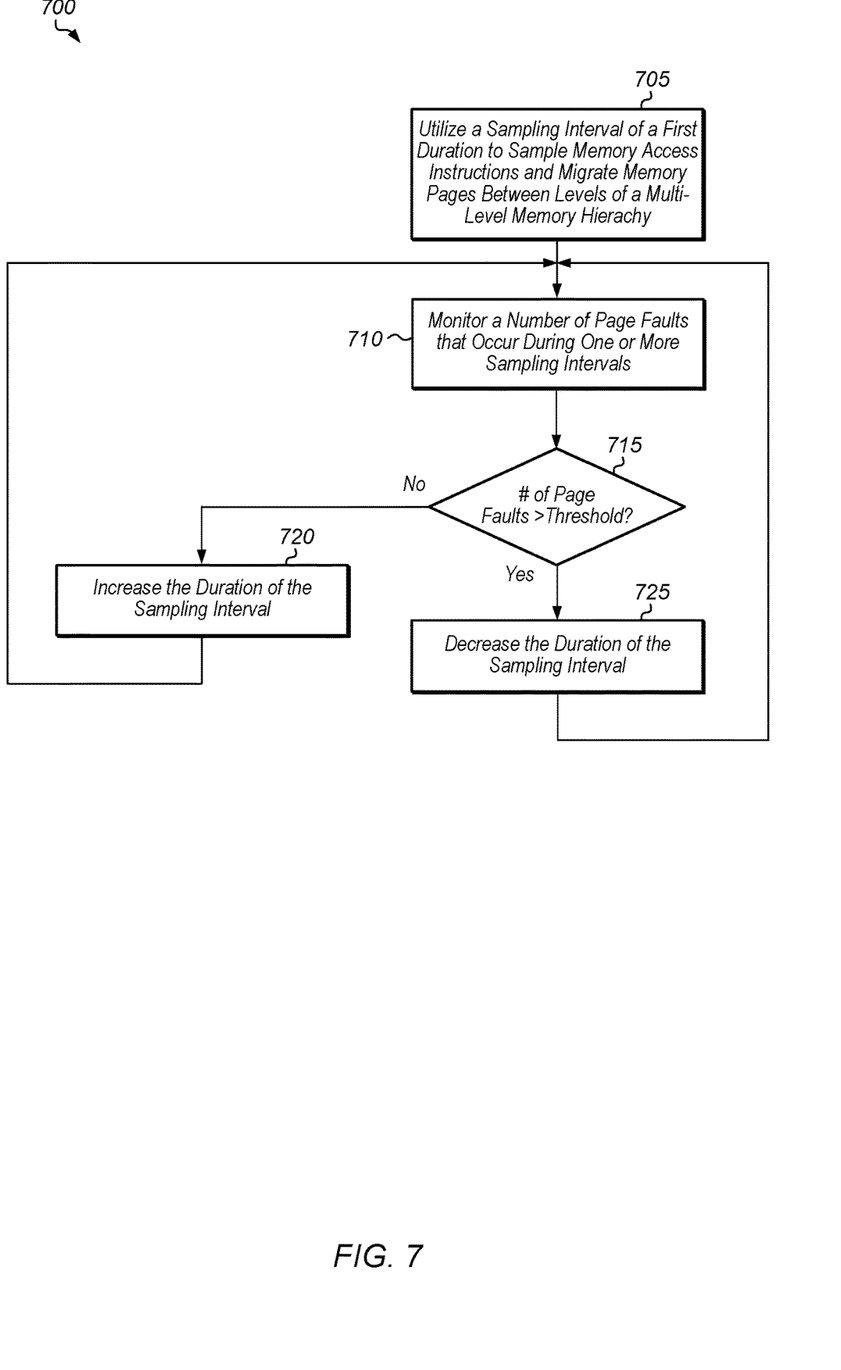
FIG. 7 is a generalized flow diagram illustrating another embodiment of a method for adjusting the duration of a sampling interval.

Referring now to FIG. 5, one embodiment of a method 500 for migrating memory pages between levels of memory is shown. For purposes of discussion, the steps in this embodiment and those of FIGS. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

Metadata associated with a portion of memory access instructions executed by one or more processors in a sampling interval are recorded (block 505). In various embodiments, this metadata can include a timestamp, instruction address, data virtual address, data physical address, load or store status, cache miss statistics, and/or other metrics associated with the execution of each memory access instruction. In one embodiment, the system selects only a portion of the total number memory access instructions which are being executed for monitoring. In one embodiment, the processor(s) are part of a computing system which also includes multiple memory levels. In one embodiment, a first memory level of the computing system is a relatively fast memory with a relatively small capacity while a second memory level is a relatively slow memory with a relatively high capacity.

Next, the system analyzes the metadata associated with the portion of memory access instructions (block 510). The metadata can be analyzed and processed by system software, the operating system, a software application, a hardware component, a logic unit, and/or any combination of these entities. In one embodiment, the metadata is processed to determine the memory pages which had the highest number of accesses in one or more sampling intervals. In another embodiment, the metadata is processed to determine the memory pages which were most recently accessed. In a further embodiment, the metadata is processed to determine historical patterns of accesses to the memory pages during one or more previous sampling intervals. In a still further embodiment, the metadata is processed using a combination of any of the above techniques to rank memory pages according to the likelihood that they will be accessed in a subsequent sampling interval. In some embodiments, the processing of metadata can rank memory objects according to the likelihood that they will be accessed in a subsequent sampling interval, with a memory object including full pages or parts of pages. Accordingly, analysis and migration can be performed on a per-object basis in some embodiments or on a per-page basis in other embodiments.

Then, the system generates predictions on which memory pages will be accessed in a subsequent interval based on the analysis of the metadata (block 515). Next, the system migrates one or more memory pages to a first memory level from a second memory level responsive to predicting that the memory page(s) will be accessed in the subsequent interval (block 520). After block 520, method 500 ends. Alternatively, after block 520, method 500 can return to block 505 and sample metadata for memory access instructions executed in the subsequent sampling interval.

Turning now to FIG. 6, one embodiment of a method 600 for adjusting the duration of a sampling interval is shown. In the example shown, a system is configured to utilize a sampling interval of a first duration to sample memory access instructions and migrate memory pages between levels of a multi-level memory hierarchy (block 605). The system is configured to monitor a number of memory access instructions that are executed during a given period of time (block 610). The duration of the given period of time can vary from embodiment to embodiment. For example, the given period of time can be a single sampling interval, multiple sampling intervals, a single sampling interval followed by multiple non-sampling intervals, or periods of other durations. If the number of memory access instructions executed in the given period of time is above a threshold (conditional block 615, "yes" leg), then the system decreases the duration of the sampling interval (block 620). In other words, the system utilizes a sampling interval of a second duration, with the second duration being less than the first duration. In another embodiment, the system can increase the number of non-sampling intervals in block 620. For example, if the system currently uses one sampling interval followed by nine non-sampling intervals, the system could increase the number of non-sampling intervals that follow the sampling interval. This would decrease the frequency of the occurrence of sampling intervals.

If the number of memory access instructions executed in the given period of time is below the threshold (conditional block 615, "no" leg), then the system increases the duration of the sampling interval (block 625). In other words, the system utilizes a sampling interval of a third duration, with the third duration being greater than the first duration. In another embodiment, the system can decrease the number of non-sampling intervals in block 625. For example, if the system currently uses one sampling interval followed by nine non-sampling intervals, the system could decrease the number of non-sampling intervals that follow the sampling interval. This would increase the frequency of the occurrence of sampling intervals. In a further embodiment, the system can keep the duration of the sampling interval unchanged in blocks 620 and/or 625 if the number of memory access instructions executed is relatively close to the threshold. After blocks 620 and 625, method 600 can return to block 610. In some cases, method 600 can pause or wait before returning to block 610, such that method 600 is performed periodically rather than continuously.

It is noted that in other embodiments, the system can utilize multiple thresholds. For example, in another embodiment, a first threshold can be used to determine whether to increase the sampling interval, and a second threshold can be used to determine whether to decrease the sampling interval. In this embodiment, the first threshold can be less than the second threshold, and if the number of memory access instructions executed in the given period of time is in between the first and second thresholds, then the current duration of the sampling interval can be maintained. Other embodiments can utilize other numbers of thresholds and/or vary how much the duration of the sampling interval is changed depending on the comparison of the number of memory access instructions executed in given period of time to the thresholds. For example, in a further embodiment, the change in the duration of the sampling interval can be proportional to the number of memory access instructions executed in the given period of time.

Referring now to FIG. 7, another embodiment of a method 700 for adjusting the duration of a sampling interval is shown. In the example shown, a system is configured to utilize a sampling interval of a first duration to sample memory access instructions and migrate memory pages between levels of multi-level memory hierarchy (block 705). The system is configured to monitor a number of page faults that occur during a given period of time (block 710). If the number of page faults that occur during the given period of time is above a threshold (conditional block 715, "yes" leg), then the system decreases the duration of the sampling interval (block 720). If the number of page faults that occur during the given period of time is below the threshold (conditional block 715, "no" leg), then the system increases the duration of the sampling interval (block 725). After blocks 720 and 725, method 700 can return to block 710. In some cases, method 700 can pause or wait before returning to block 710, such that method 700 is performed periodically rather than continuously.

It is noted that in other embodiments, the system can utilize multiple thresholds. For example, in another embodiment, a first threshold can be used to determine whether to increase the sampling interval, and a second threshold can be used to determine whether to decrease the sampling interval. In this embodiment, the first threshold can be less than the second threshold, and if the number of page faults detected in the given period of time is in between the first and second thresholds, then the current duration of the sampling interval can be maintained.

In another embodiment, the system can also check if the number of memory access instructions executed during the given period of time is above or below a threshold in addition to determining the number of page faults that have occurred during the given period of time. For example, in this embodiment, if the number of memory access instructions executed during the given period of time is above a first threshold and if the number of page faults during the given period of time is above a second threshold, then the system can decrease the duration of the sampling interval. In other embodiments, other conditions can be checked for use in determining whether to increase, decrease, or maintain the current duration of the sampling interval.

In one embodiment, the sampling interval is adjusted to target a fixed overhead. For example, the sampling interval can be adjusted to maintain constant cost. Accordingly, the sampling interval can be adjusted based on the measured memory instruction or CPU instruction overhead. In one embodiment, the system can adjust the sampling interval to keep the measured memory instruction or CPU instruction overhead less than a programmable threshold. In another embodiment, the system can adjust the sampling interval to keep the measured memory instruction or CPU instruction overhead within a given range which is specified using high and low range indicators.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
one or more processors; and
a multi-level memory hierarchy including at least a first memory level comprising a first storage device and a second memory level comprising a second storage device;
wherein the system comprises circuitry configured to:

record metadata associated with memory access instructions executed by the one or more processors in one or more previous sampling intervals;
generate predictions on which memory pages will be accessed in a subsequent sampling interval based on the recorded metadata;
migrate one or more memory pages stored in the second memory level to the first memory level responsive to predicting that the one or more memory pages will be accessed in the subsequent sampling interval; and
select a subsequent sampling interval duration based on monitoring at least one of a number of page faults that occur and a number of memory access instructions that are executed during the one or more sampling intervals, such that the duration of the subsequent sampling interval is decreased responsive to determining at least one of the number of page faults and the number of memory access instructions that are executed during the one or more previous sampling intervals is above a threshold.

2. The system as recited in claim 1, wherein the system is configured to adjust the sampling interval duration to keep a measured instruction overhead less than a programmable threshold.

3. The system as recited in claim 1, wherein the system is configured to:
increase the duration of the subsequent sampling interval, responsive to determining at least one of:
the number of memory access instructions executed during the one or more previous sampling intervals is below a first threshold; and
the number of page faults during the one or more previous sampling intervals is below a second threshold.

4. The system as recited in claim 1, wherein the system is configured to decay previous predictions over multiple sampling intervals for use in determining subsequent predictions.

5. The system as recited in claim 1, wherein the metadata comprises an instruction address, data virtual address, data physical address, load or store status, or cache miss statistics.

6. A method comprising:
recording metadata associated with memory access instructions executed by one or more processors in one or more previous sampling intervals;
generating predictions on which memory pages will be accessed in a subsequent sampling interval based on the recorded metadata;
migrating one or more memory pages to a first memory level comprising a first storage device from a second memory level comprising a second storage device responsive to predicting that the one or more memory pages will be accessed in the subsequent sampling interval; and
selecting a subsequent sampling interval duration based on monitoring at least one of a number of page faults that occur and a number of memory access instructions that are executed during the one or more sampling intervals, such that the duration of the subsequent sampling interval is decreased responsive to determining at least one of the number of page faults and the number of memory access instructions that are executed during the one or more previous sampling intervals is above a threshold.

7. The method as recited in claim 6, further comprising adjusting the sampling interval duration to keep a measured instruction overhead less than a programmable threshold.

8. The method as recited in claim 6, further comprising:
increasing the duration of the subsequent sampling interval responsive to determining at least one the number of memory access instructions executed during the one or more previous sampling intervals is below a first threshold and responsive to determining the number of page faults during the one or more previous sampling intervals is below a second threshold.

9. The method as recited in claim 6, further comprising decaying previous predictions over multiple sampling intervals for use in determining subsequent predictions.

10. The method as recited in claim 6, wherein the metadata comprises an instruction address, data virtual address, data physical address, load or store status, or cache miss statistics.

11. A non-transitory computer readable storage medium storing program instructions, wherein the program instructions are executable by a processor to:
record metadata associated with memory access instructions executed by one or more processors in one or more previous sampling intervals;
generate predictions on which memory pages will be accessed in a subsequent sampling interval based on the recorded metadata;
migrate one or more memory pages to a first memory level comprising a first storage device from a second memory level comprising a second storage device responsive to predicting that the one or more memory pages will be accessed in the subsequent sampling interval; and
select a subsequent sampling interval duration based on monitoring at least one of a number of page faults that occur and a number of memory access instructions that are executed during the one or more sampling intervals, such that the duration of the subsequent sampling interval is decreased responsive to determining at least one of the number of page faults and the number of memory access instructions that are executed during the one or more previous sampling intervals is above a threshold.

12. The non-transitory computer readable storage medium as recited in claim 11, wherein the program instructions are further executable by a processor to adjust the sampling interval duration to keep a measured instruction overhead less than a programmable threshold.

13. The non-transitory computer readable storage medium as recited in claim 11, wherein the program instructions are further executable by a processor to:
increase the duration of the subsequent sampling interval responsive to determining at least one of the number of memory access instructions executed during the one or more previous sampling intervals is below a first threshold and responsive to determining the number of page faults during the one or more previous sampling intervals is below a second threshold.

14. The non-transitory computer readable storage medium as recited in claim 11, wherein the program instructions are further executable by a processor to decay previous predictions over multiple sampling intervals for use in determining subsequent predictions.

* * * * *